United States Patent
Ekman

(10) Patent No.: US 8,208,532 B2
(45) Date of Patent: Jun. 26, 2012

(54) METHOD AND APPARATUS FOR DATA COMPRESSION AND DECOMPRESSION

(75) Inventor: Magnus Ekman, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1120 days.

(21) Appl. No.: 12/059,393

(22) Filed: Mar. 31, 2008

(65) Prior Publication Data

US 2009/0245382 A1    Oct. 1, 2009

(51) Int. Cl.
*H04N 7/12* (2006.01)

(52) U.S. Cl. ........................................................ 375/240

(58) Field of Classification Search ................ 375/240, 375/240.01, 240.02, 240.24; 707/693; 710/68; 711/1–3, 100
See application file for complete search history.

(56) References Cited

U.S. PATENT DOCUMENTS

| | | | | |
|---|---|---|---|---|
| 5,467,087 | A * | 11/1995 | Chu | 341/51 |
| 6,075,470 | A * | 6/2000 | Little et al. | 341/107 |
| 6,253,264 | B1 * | 6/2001 | Sebastian | 710/68 |
| 7,130,913 | B2 * | 10/2006 | Fallon | 709/231 |
| 7,161,506 | B2 * | 1/2007 | Fallon | 341/51 |
| 7,492,290 | B1 * | 2/2009 | Schneider | 341/67 |
| 7,564,861 | B1 * | 7/2009 | Subbiah | 370/428 |

OTHER PUBLICATIONS

Abali et al., "Performance of Hardware Compressed Main Memory", High-Performance Computer Architecture, HPCA, The Seventh International Symposium on High-Performance Computer Architecture, Jan. 2001, pp. 73-81.
Alameldeen et al., "Adaptive Cache Compression for High-Performance Processors", 31st Annual International Symposium on Computer Architecture, Munich, Germany Jun. 19-23, 2004, pp. 1-12.
Alameldeen et al., "Frequent Pattern Compression: A Significance-Based Compression Scheme for L2 Caches", Technical Report 1500, Computer Sciences Dept., UW-Madison, Apr. 2004, pp. 1-14.
Burrows et al., "A Block-Sorting Lossless Data Compression Algorithm", SRC Research Report, Systems Research Center, 130 Lytton Avenue, Palo Alto, CA 94301, May 10, 1994, pp. 1-24.
Tremaine et al., "Pinnacle: IBM MXT in a Memory Controller Chip", IEEE, vol. 21, Issue 2, Mar./Apr. 2001, pp. 56-68.
Storer et al., "Data Compression Via Textual Substitution", Journal of the Association for Computing Machinery, vol. 29, No. 4, Oct. 1982, pp. 928-951.
Tremaine et al., "IBM Memory Expansion Technology (MXT)", IBM J. Res. & Dev., vol. 45, No. 2, Mar. 2001, pp. 271-285.
Ziv et al. "A Universal Algorithm for Sequential Data Compression", IEEE Transactions on Information Theory, vol. IT-23, No. 3, May 1977, pp. 337-343.

* cited by examiner

*Primary Examiner* — Dmitry H Levitan
(74) *Attorney, Agent, or Firm* — Park, Vaughan, Fleming & Dowler LLP

(57) ABSTRACT

A method and apparatus for compressing data automatically selects either direct compression of sub-blocks or of compression of transformed sub-blocks to achieve fast and effective data compression. A method and apparatus for decompression automatically performs either direct decompression or decompression and transform operations for respective sub-blocks.

18 Claims, 8 Drawing Sheets

| Field Name | Size (bits) | Description |
|---|---|---|
| Compressed flag | 1 | Indicates if the cache block is compressed |
| Sub-block Configuration Tag | $Log_2$ (number of transforms) | Indicates which transform (n and m size) that is used |
| Sub-block flags | Max sub-block (or variable) | Indicates if transform or FPC used for sub-block |
| Repeat flags | N | Indicates if the word consists of repeated bytes |
| Compression prefixes | Variable | Compression prefixes for sub-blocks that are not transformed |
| Non-transformed data | Variable | Data for sub-blocks that are not transformed |
| Transform data | Variable | Data for sub-blocks that are transformed |

| Field Name | Size (bits) | Description |
| --- | --- | --- |
| Compressed flag | 1 | Indicates if the cache block is compressed |
| Sub-block Configuration Tag | $Log_2$ (number of transforms) | Indicates which transform (n and m size) that is used |
| Sub-block flags | Max sub-block (or variable) | Indicates if transform or FPC used for sub-block |
| Repeat flags | N | Indicates if the word consists of repeated bytes |
| Compression prefixes | Variable | Compression prefixes for sub-blocks that are not transformed |
| Non-transformed data | Variable | Data for sub-blocks that are not transformed |
| Transform data | Variable | Data for sub-blocks that are transformed |

Fig. 6

```
K := number of implemented transforms;
best_transform := no_transform;
smallest_size := b;
loop k times {
        size := 0;
        assign n and m according to next transform;
        loop over all (b/(n*m)) sub-blocks {
                loop m times {
                        create a row from next n bytes;
                }
                transpose matrix;
                loop n times {
                        if(row consists of repeated bytes) {
                                temp := first byte;
                                set transform bit;
                        } else {
                                temp := entire row;
                                clear transform bit;
                        }
                }
                if(temp > FPC compressed sub-block) {
                        temp := FPC compressed sub-block;
                        clear sub-block bit;
                }
                size := size + temp;
        }
        if(size < smallest_size) {
                best_transform := this transform;
                smallest_size := size;
        }
}
if(best_transform != no_transform) {
        set compressed bit;
}
```

Fig. 7

```
If(compressed bit = 1) {
    assign n and m according to tag;
    loop (b/(n*m)) times {
        if(next sub-block bit = 1) {
            loop n times {
                if(next transform bit = 1) {
                    create a row by replicating next
                    byte m times;
                } else {
                    create a row from next m bytes;
                }
            }
            transpose matrix;
            output each row in top down order;
        } else {
            Use FPC to decompress and output subblock;
        }
    }
} else {
    output b original bytes;
}
```

Fig. 8

METHOD AND APPARATUS FOR DATA COMPRESSION AND DECOMPRESSION

FIELD

This invention relates to a method and apparatus for data compression and decompression data in memory of a computer system.

BACKGROUND

Data compression schemes are known to compress data held in the memory of a computer system. These schemes increase the effective capacity of the memory.

Computer systems often employ a hierarchical arrangement of memory levels in which smaller capacity but faster memory is located closer to a processor, whereas larger capacity but slower memory is provided at lower, more distant levels. For example, one such arrangement includes three memory levels in order of decreasing distance from the processor: storage (e.g., a hard disk), main memory (e.g., RAM) and cache memory. Additional cache memory levels can also be included. For example, in a two-level cache arrangement, a so-called L1 cache can be provided in between a processor and an L2 cache. Such an arrangement would include four memory levels in total. Where the processor registers are considered as a level of memory, then there would be five memory levels in this example.

In a hierarchical memory, data compression can be used between two levels of memory, to increase the effective capacity of the memory level which is more distant from the processor. For example, compression of uncompressed data from a first level memory of a computer system can be effected for storage in a second level memory of the computer system. Similarly, decompression of compressed data in a second level memory of a computer system can be effected for storage in a first level memory of the computer system.

Thus, compression can be used between memory levels, for example between a cache and a main memory. When data is written to the memory level which is more distant from the processor (also known as the lower memory level), a data compression scheme can be applied such that the data is stored in the more distant memory element in compressed form. Conversely, when data is read from the lower memory level in compressed form, the data compression scheme can be applied (hereinafter referred to as the data decompression scheme, although it will be understood that the data decompression scheme is normally just the reverse application of the data compression scheme) to decompress the data for entry into a higher memory level, which is less distant from the processor.

Memory in computer systems is normally arranged in a plurality of words. For example, a cache can comprise a plurality of cache lines, or cache blocks. Each cache line, or cache block, can typically store one or more data words. In many memory protocols, data is retrieved and written into a cache memory on a block-by-block basis. Similar considerations apply to main memory and storage. When a data compression scheme is applied, it can be applied on a block-by-block and/or word-by-word basis.

Various compression algorithms have been described in the literature. For example, a compression algorithm known as the LZ77 (also known as LZ1) algorithm is described in an article by Ziv J., and Lempel A, entitled "A Universal Algorithm for Sequential Data Compression", IEEE Transactions on Information Theory, Vol. 23, No. 3, pages 337-343, 1977.

Storer J. A. and Szymanski T. G. described an algorithm known as the LZSS algorithm in "Data Compression via Textual Substitution", Journal of the ACM. Vol. 29, pages 928-951, 1982. This is a derivative of the LZ77 algorithm and is known to be robust when the input data is fairly small and thus should be well suited for compressing individual cache blocks. This was shown to be the case in a paper by Alameldeen A. R. and Wood D. A. entitled "Frequent Pattern Compression: A Significance-Based Compression Scheme for L2 Caches", Technical Report 1500, Computer Sciences Department, University of Wisconsin-Madison, April 2004. Briefly, this algorithm uses a sliding window and uses bytes as a symbol size. Each symbol in the input is either represented by a literal (the byte itself) or by a reference to the previously decompressed symbols added with information about how many symbols that matches. Thus, if a repeated pattern is found, it can be very efficiently encoded. Two examples of such repetitive patterns in in-memory data are pointers to nearby locations where the most significant bits of each pointer typically have the same value, and small positive and negative integer values where the most significant bits are all zeros or all ones. A drawback with LZSS, however, is that it is inherently serial in the sense that a byte cannot be uncompressed unless all prior bytes have been decompressed. Thus, the latency is fairly high.

The so-called Frequent Pattern Compression (FPC) algorithm was proposed by Alameldeen and Wood as a fast algorithm for cache compression in their paper previously referred to, namely Alameldeen A. R. and Wood D. A. "Frequent Pattern Compression: A Significance-Based Compression Scheme for L2 Caches", Technical Report 1500, Computer Sciences Department, University of Wisconsin-Madison, April 2004. FPC divides a cache block into 32 bit words, which are decompressed in parallel. Each 32 bit word is represented by a three bit prefix followed by between four and 32 bits, e.g. an integer that can be represented with eight bits is encoded by the prefix followed by the eight bits for the integer. The decoder recognizes the prefix and adds three zeroed bytes in front of the eight bits to recreate the data. The main aim of FPC is to remove consecutive zero bits and consecutive one bits by encoding the so called frequent patterns. The patterns used are 4-bit sign extended (SE), single byte SE, half word SE, half word padded with zero half word, two half words each consisting of sign-ext ended byte patterns. FPC also has a special prefix to be able to encode several consecutive zero words efficiently. One of the prefixes is used to represent repeated bytes within a 32 bit word, e.g. 0xfefefefe. FPC is much faster than LZSS since it does not suffer from the dependencies between bytes. On the other hand it cannot exploit the value locality in the example with nearby pointers in the last section.

FIG. 1 represents a method of compressing uncompressed data as described in U.S. patent application Ser. No. 11/251, 257. In this compression method, which starts as 10, the uncompressed data is assumed to comprise a plurality of data words, the data words comprising a plurality of data groups $G_{jk}$, wherein k denotes the $k^{th}$ data group in the $j^{th}$ data word. The method comprises: applying 12 a transform to produce a transformed plurality of data words, the transform being of the form $G_{jk} \rightarrow G_{kj}$; and applying 14 a data compression scheme to each data word in the plurality of transformed data words, the process ending at 16.

FIG. 2 represents a method of compressing uncompressed data as described in U.S. patent application Ser. No. 11/251, 257. In this decompression method, which starts at 20, the compressed data is decompressed at 22 to generate decompressed data words comprising a plurality of data groups $G_{kj}$, wherein j denotes the $j^{th}$ data group in the $k^{th}$ decompressed data word; and a transform is applied at 24 to produce a transformed plurality of data words, the transform being of the form $G_{kj} \rightarrow G_{jk}$. The process ends at 26. As set out in U.S. patent application Ser. No. 11/251,257, by applying a simple transform (transposing the matrix), the efficiency of FPC can be improved in at least some circumstances.

The present invention seeks to improve yet further the efficiency of prior compression schemes.

SUMMARY

Aspects of the invention are set out in the accompanying claims. Combinations of features from the dependent claims may be combined with features of the independent claims as appropriate and not merely as explicitly set out in the claims.

An embodiment can provide a method of compressing data comprising blocks of data. The method can include dividing a block of data into sub-blocks. For each sub-block, the smaller of a compressed representation of a transform of the sub-block and a compressed representation of the sub-block is determined. Where an accumulated size of the determined smaller compressed representations of the sub-blocks is smaller than a size of the block, the determined smaller compressed representations of the sub-blocks are selected as a compressed representation of the block.

An embodiment can provide a method of decompressing blocks of data. The method can include, for each of a plurality of sub-blocks of a block of compressed data, determining whether the sub-block comprises compressed data derived from uncompressed data that was transformed or uncompressed data that was not transformed. The method can further include decompressing and transforming the data where the sub-block comprises compressed data derived from uncompressed data that was transformed or decompressing without transforming the data where the sub-block comprises compressed data derived from uncompressed data that was not transformed.

The above described methods can be performed in conjunction with each other for compressing and decompressing data as required.

The methods described above can be used for compressing and decompressing data between different memory levels in a hierarchical memory in a computer system.

The methods described above can be used for compressing and decompressing data for data transfer between two locations.

The methods described above can be implemented by an apparatus.

Although the present invention can be implemented by hardware or firmware, it can also be implemented as a computer program product. The computer program product can, for example, be provided on a carrier medium.

Although various aspects of the invention are set out in the accompanying independent claims, other aspects of the invention include any combination of features from the described embodiments and/or the accompanying dependent claims with the features of the independent claims, and not solely the combinations explicitly set out in the accompanying claims.

BRIEF DESCRIPTION OF THE DRAWINGS

Embodiments of this invention will be described hereinafter, by way of example only, with reference to the accompanying drawings in which like reference signs relate to like elements.

FIG. 6 illustrates an example format for a block of compressed data;

FIG. 7 is a flow diagram, expressed in terms of pseudo code for an example compression unit; and FIG. 8 is a flow diagram, expressed in terms of pseudo code for an example decompression unit.

Figure 1:
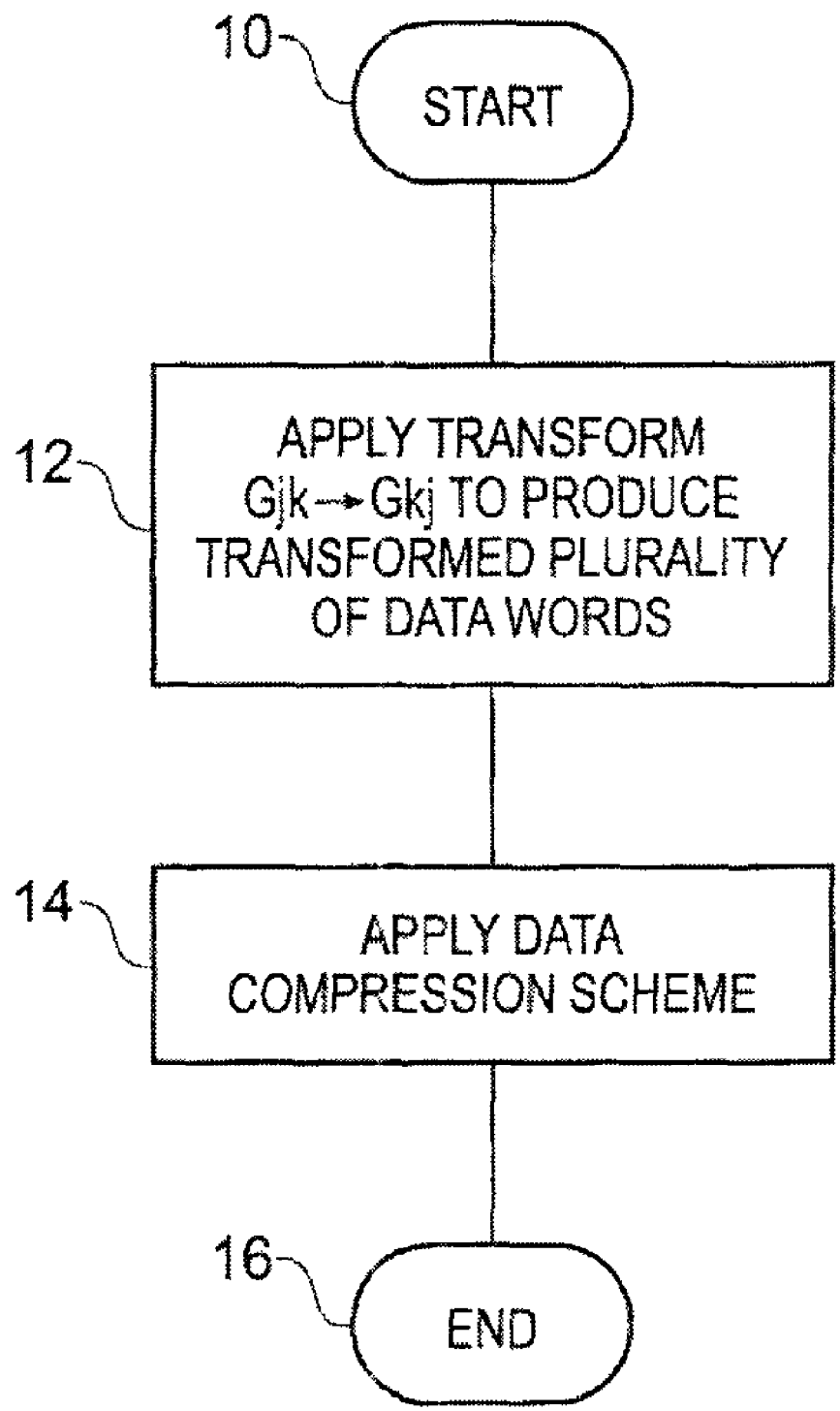
FIG. 1 illustrates a known method of compressing data in a first level memory of a computer system for storage in a second level memory of the computer system.
Figure 2:
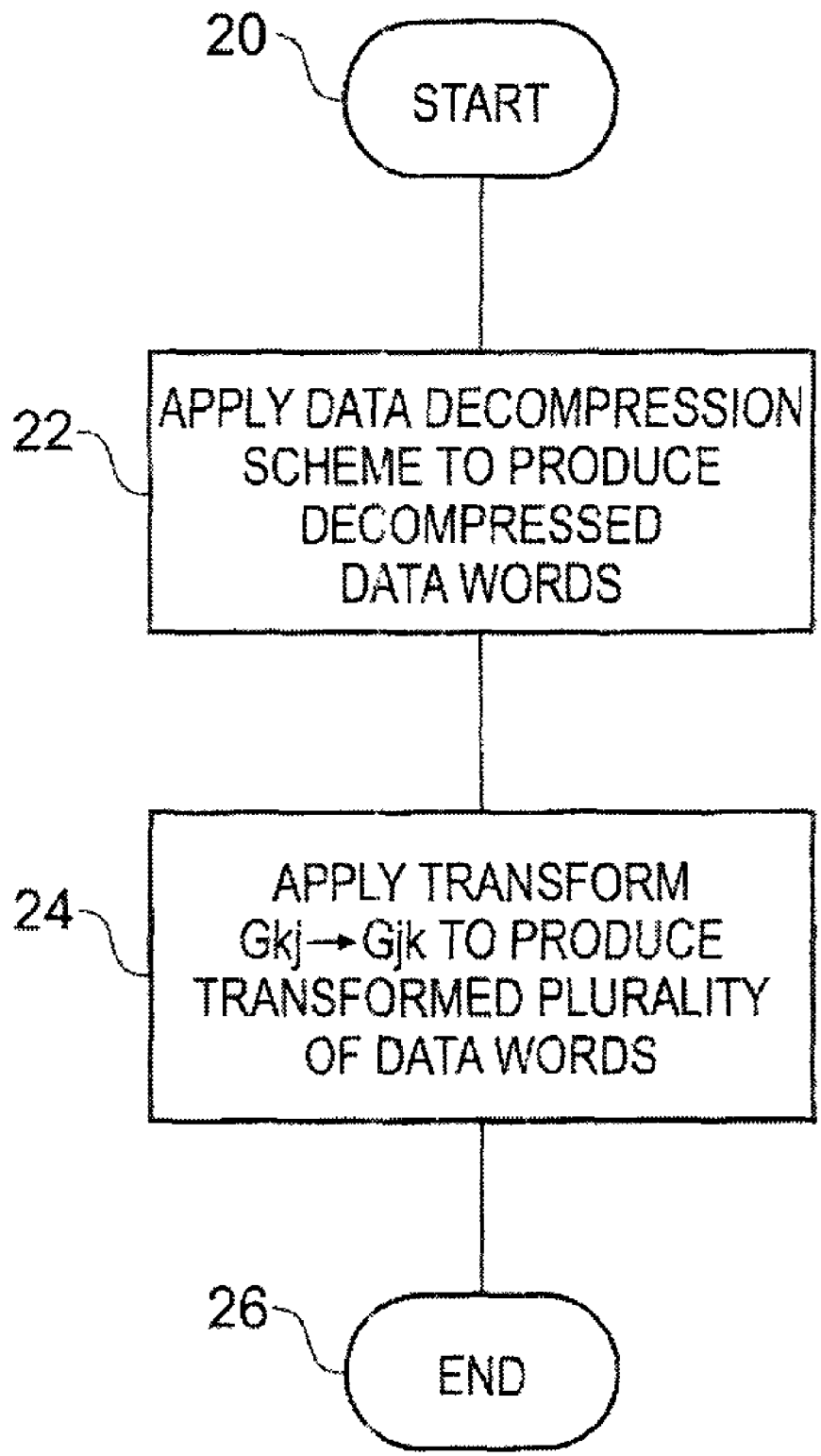
FIG. 2 illustrates a known method of decompressing compressed data in a second level memory of a computer system for storage in a first level memory of the computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims. In this regard, combinations of features from the independent claims with features of dependent claims other than as presented by the dependencies of the claims, and also with features from the description, are envisaged.

DETAILED DESCRIPTION

Example embodiments of this invention are described in the following with reference to the accompanying drawings.

The prior approach to compression and decompression is based on rearranging in-memory data to enable better compression. The prior approach to compression employs transformation followed by compression. Similarly the prior approach to decompression employs decompression followed by transformation.

Embodiments of the present invention can further improve on the prior methods and apparatus. An embodiment of the present invention avoids the need to first apply a transform and then to apply compression (e.g., using FPC). Instead it integrates the transformation and the compression algorithm in a tighter yet more flexible manner. An embodiment of the present invention can thus provide better compressibility as well as reduced latency by avoiding the serialization needed by first applying the transform and thereafter FPC decompression.

There will now be described a number of different examples of apparatus which can be used to implement this invention. As described above, this invention can be applied between different levels in a hierarchical memory in a computer system. For example, it can be used for compressing data which is held in a lower level of the hierarchical memory, and for decompression and entry into a higher level memory in a hierarchical memory when required. As described above, this allows the effective capacity of the lower level memory to be increased, although this does involve a reduction in speed due to computations required for application of the transform and compression schemes.

Figure 3:
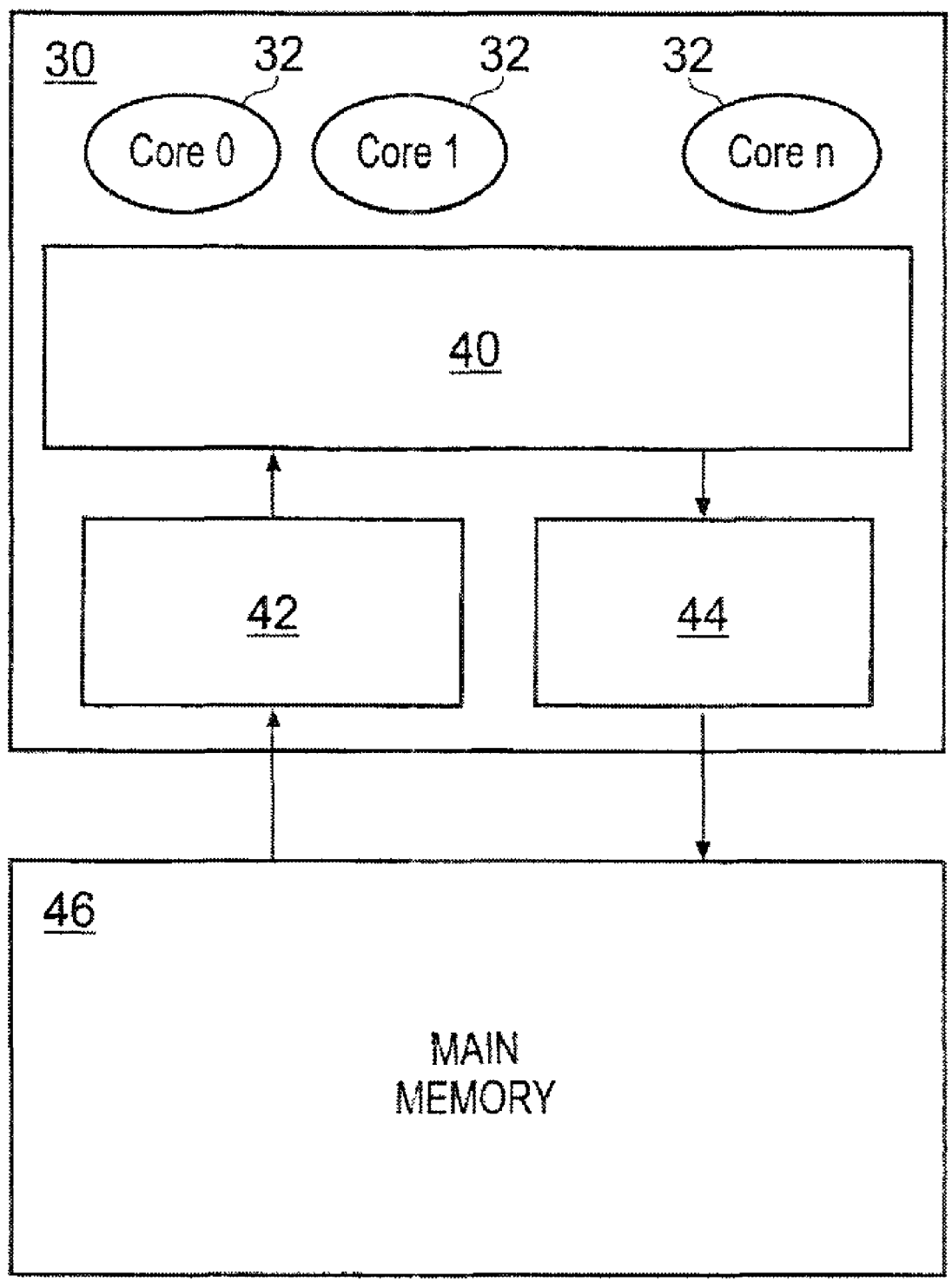
FIG. 3 illustrates an example arrangement of a processor and memory hierarchy and a number of compression and decompression units.

A first arrangement is shown in FIG. 3. FIG. 3 shows a processor chip 30, which comprises a number of processor cores 32, which are labeled core 0, core 1 . . . core n. In this example, a hierarchical memory is provided which comprises a main memory 46 and a number of on-chip caches labeled generally at 40. The main memory 46 is located away from the processor chip 30 and can, for example, comprise RAM such as dual in line memory modules (DIMMs). Thus, the hierarchical memory in this example comprises a first level memory (the on-chip caches 40) and a second level memory (the main memory 46). The first level memory is less distant from the processor cores 32 than is the second level memory. As described above, this arrangement is well known in the art of computer architecture, for producing a balance between speed and capacity in which lower capacity but faster memory types are located closer to processors than are larger capacity yet slower memory types. Embodiments of this invention allow data, which is stored in uncompressed form in a first level memory, such as the on-chip caches 40, to be compressed when it is written to a second level memory, such as the main memory 46, thereby to improve the effective capacity of the second level memory.

Figure 4:
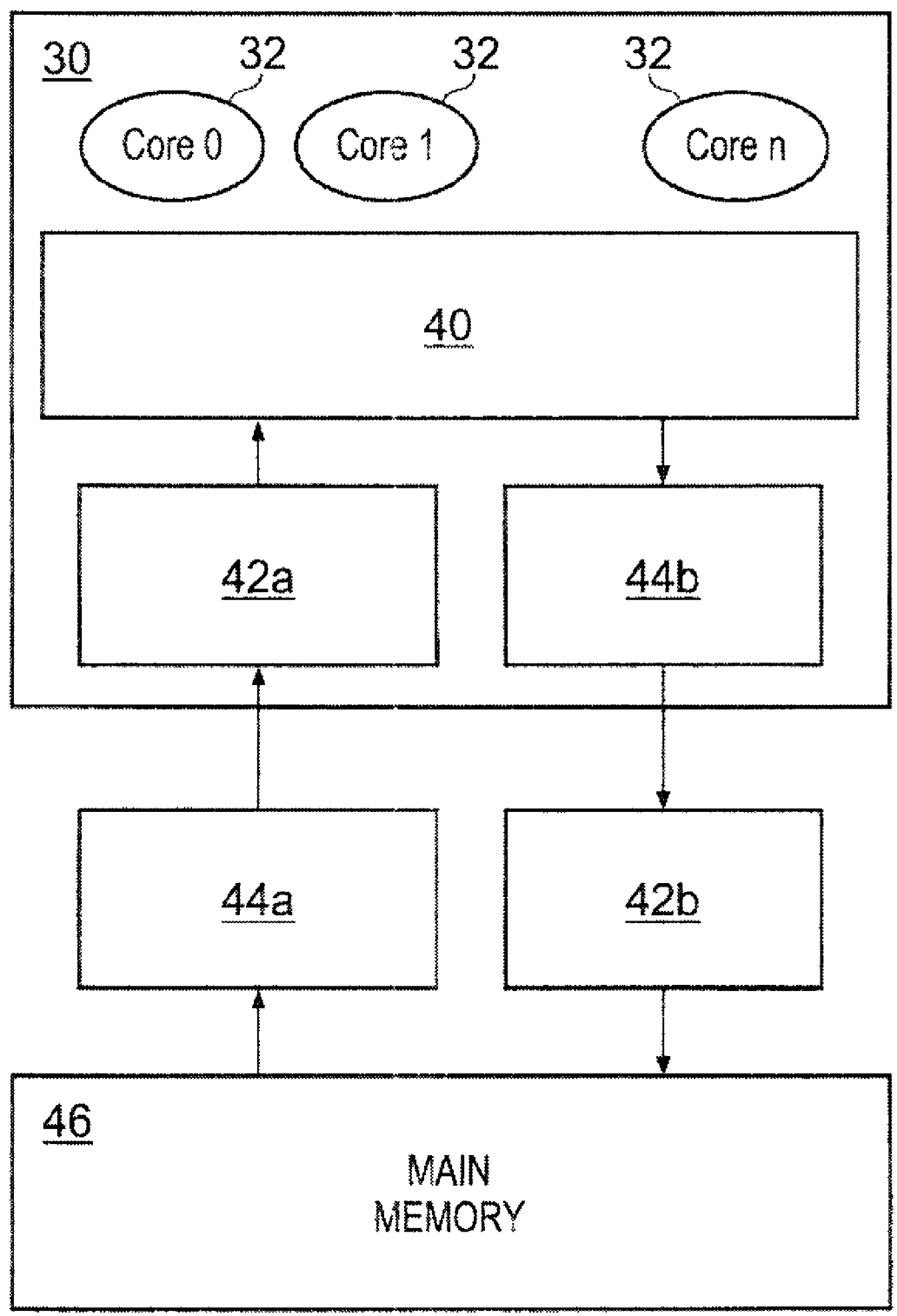
FIG. 4 illustrates another example arrangement of a processor and memory hierarchy and a number of compression and decompression units.
Figure 5:
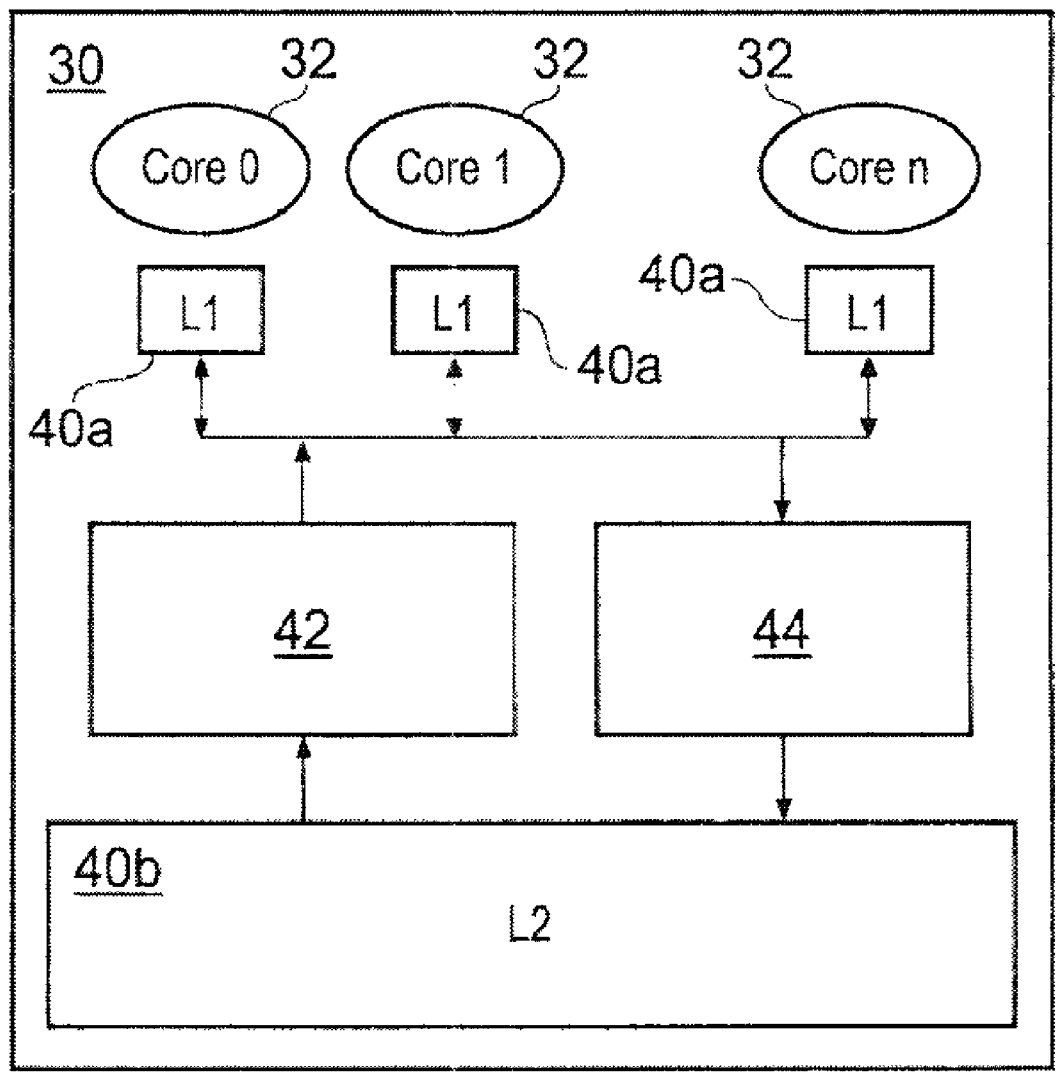
FIG. 5 illustrates a further example arrangement of a processor and memory hierarchy and a number of compression and decompression units.

The on-chip caches 40 are linked to the main memory 46 by a number of buses, which are shown in FIG. 3, and also in FIGS. 4 and 5, as arrows. The direction of the arrows in these figures generally indicates the direction of data flow. It will be noted that data flowing from the on-chip caches 40 to the main memory 46 encounters a compression unit 44, which, in this example, is provided on the processor chip 30. Similarly, when data is read from the main memory 46 to the on-chip caches 40, it is retrieved via a decompression unit 42. In general terms, the compression unit 44 is operable to take data which is being read from the on-chip caches 40 and apply a compression method as described hereinafter, prior to writing it to the main memory 46. Similarly, and again in general terms, the decompression unit 42 is operable to apply a decompression method as described hereinafter to data, which is read from the main memory 46, prior to writing it to the on-chip caches 40.

Another arrangement is shown in FIG. 4. In this example, a processor chip 30 includes a number of processor cores 32 as described above. Again, a number of on-chip caches 40 and a main memory 46 are provided, by way of the first and second levels of a hierarchical memory arrangement. The example shown in FIG. 4 differs from the example shown in FIG. 3 insofar as two decompression units 42a and 42b and two compression units 44a and 44b are provided. The decompression unit 42a and the compression unit 44b are provided on-chip while the compression unit 44a and the decompression unit 42b can be provided off chip. This arrangement allows data to be compressed in either direction of data flow, as appropriate. For example, it is envisaged that data may be held in the on-chip caches 40 in compressed form and decompressed before storage in the main memory.

FIG. 5 shows a further arrangement. In this example, a processor chip 30 includes a number of processor cores 32 as described above in relation to FIGS. 3 and 4. The hierarchical memory in this example includes two cache levels. Thus, there are provided a plurality of L1 caches 40a, and an L2 cache 40b. These two cache levels are connected by a series of data buses shown in FIG. 5 in the form of arrows. In between the two memory levels are provided a decompression unit 42 and a compression unit 44. It is noted that this embodiment is implemented on a processor chip 30, there being no express need for components external to the processor chip 30.

It is envisaged that various embodiments can be implemented using combinations of arrangements of the kind shown in FIGS. 3 to 5. Thus, for example, compression units can be employed between more than two memory levels. In particular, it is envisaged that an arrangement such as that shown in relation to FIG. 5 could also include an off-chip main memory such as that described in relation to FIGS. 3 and 4 and a compression unit and a decompression unit, which can be provided either on or off-chip.

Accordingly, example embodiments can compress and decompress data between two levels of memory, which may be adjacent in a memory hierarchy. Data compression between two levels of memory can be enhanced by selectively applying a transform on a sub-block basis which has a tendency to group together repetitive data values as part of a data compression scheme. In computer memories, repetitive data values tend to occur towards one end (the most significant bits) of a data word. The selective transform on a sub-block basis can produce transformed data words in which repetitive data values are brought together in one or more transformed data words.

An embodiment of the present invention can selectively use a transform approach or a direct compression approach on a sub-block-by-sub-block basis as will be described in more detail hereinafter. It can remove the need for several versions of a compression algorithm such as FPC. Where a transform approach is used on a sub-block, a frequent pattern that is used is can be a repeated byte pattern. As a frequent pattern that is used is a repeated byte pattern, and the number of repetitions is implicitly encoded by the type of transform (the same number of repetitions as there are rows in the matrix), an FPC prefix can be avoided altogether if it is known that data is stored in the transformed format. An embodiment does not need to use an FPC algorithm. Indeed, any suitable algorithm, for example a known drop-zero algorithm, could be used for sub-blocks where a transform approach is not used.

In an example embodiment, data is divided into sub-blocks of data having a word size of n bytes and m consecutive words, these n*m byte sub-blocks of data can be stored in a transformed and compressed form with a sub-block configuration tag that identifies the values of n and m, followed by n transform bits where each bit tells if a resulting transformed word of size m bytes consists of repeated bytes or not. One byte of data is all that is then needed for each of the m-byte transformed words that consists of repeated bytes, as well as the full m byte word for the transformed words that do not consist of repeated bytes.

In the examples above, it has been assumed that the block of data to be compressed is of the size n*m. More generally, in an example embodiment, a block size b is typically given (e.g. a cache block size). The block is then divided into b/(n*m) sub-blocks on which the transform is individually applied. If the transform is more efficient for the sub-block than another compression algorithm (e.g. FPC) on the entire sub-block, the data is stored in transformed form. One bit is kept for each sub-block to indicate if the sub-block is compressed with another algorithm or if it is transformed.

In summary, in an example embodiment, a cache block can be represented by the fields shown in FIG. 6. The compression algorithm for sub-blocks where a transform is not used could be FPC, or any other suitable algorithm.

In the present example the first field, the compressed flag, is one bit and indicates if the block is compressed or not. In the present example this bit does not need to be kept together with the rest of the compressed data. In a compressed cache, it can be kept together with the status bits. In compressed memory buses it can be transmitted as a header and for compressed main memory it can be kept in a meta-data structure. In the present example this bit is provided regardless of the chosen algorithm.

The sub-block configuration tag field comprises $\log_2(n)$ bits, where n is the number of transforms (i.e. the number of different sub-block configurations). It indicates which transform has been used. The sub-block flag field includes a sub-block flag for each sub-block identifying whether a compressed representation of a transform of a sub-block of uncompressed data or compressed representation of the sub-block of uncompressed data is used. The repeat flag field comprising repeat flags for each transformed word indicating whether stored data comprises repeated data. The prefixes field contains compression algorithm prefixes for sub-blocks that are not transformed. The first data field holds the data for sub-blocks that are not transformed. The second data field for data for sub-blocks that are transformed.

There will now be described an example of the logic operation performed by a compression unit 44 with respect to the pseudo code illustrated in FIG. 7, which set out an example compression process effected by a compression unit 44.

An example compression unit 44 is operable to either read or receive one or more data blocks to be compressed.

For a received block of data, the example compression unit 44 is operable to apply different transformations to the block based on different sub-block configurations and to determine which sub-block configuration, if any, gives effective compression, and within a sub-block, to determine whether to apply a direct compression algorithm or a transformed compression algorithm.

As set out in FIG. 7, for the sub-block the compression unit 44 can be operable to apply k different sub-block configurations to determine which, if any provides effective compression and, if so which sub-block configuration provides the best compression.

It is assumed that the data block comprises b bytes of data. In this example it is assumed that a byte comprises 8 bits. However, in other examples, a byte can comprise another number of bits.

The compression unit 44 is operable to initially set a best transform indicator to be no transform, whereby, if during the process of applying the k different sub-block configurations no sub-block configuration is determined to provide effective compression with respect to the original uncompressed block size of b bytes, then no compression will be applied to the block. In this regard, the compression unit 44 also sets a smallest size variable for a block to b bytes, that is the size of the original uncompressed block. The values of k, b and the best transform indicator can be stored in a register or in memory in the data compression unit 44.

The sub-block configurations can be chosen to include different numbers m of n byte words. In other words, each of the sub-block configurations for a respective transforms can include a different number of m*n bytes.

The compression unit 44 is operable to apply each of the different sub-block configurations. This can be done serially as indicated by the pseudo code in FIG. 7, or could be done in parallel, for example in separate hardware units, or using separate process threads processed in parallel. For ease of explanation only, the pseudo code of FIG. 7 will be explained as being processed by a single thread.

Thus, for a first transform, the compression unit 44 is operable to set a size variable to zero, and then assign n and m according to the current transform.

Then for each of the b/(n*m) sub-blocks of the block of uncompressed data, the compression unit 44 is operable to perform a set of operations.

A matrix of m rows of n bytes is generated by selecting m times, the next n bytes.

The matrix is transposed.

A compressed representation of the transformed matrix is accumulated, wherein, for each of the n rows of the transformed matrix
  if the row consists of m repeated bytes, the row is replaced by the repeated byte and a repeated (transform) flag is set,
  otherwise the m bytes of the row are retained and the repeated (transform) flag is cleared.

A compressed representation of the untransformed sub-block is generated.

If the compressed representation of the transformed matrix is larger than the compressed representation of the untransformed sub-block
  a compressed representation (temp) of the sub-block is set to be the compressed representation of the untransformed sub-block and a sub-block bit is cleared,
  otherwise the compressed representation (temp) of the sub-block is set to be the compressed representation of the transformed matrix and the sub-block bit is set.

The size variable value is set to the previous size variable value plus the size of the compressed representation of the sub-block (temp).

After processing each of the b/(n*m) sub-blocks, the compression unit 44 is operable to compare the size variable to the smallest size variable that was initially set to the size b of the uncompressed data block. If the size variable for the accumulated compressed representation of the sub-blocks for a given sub-block configuration is smaller that the size of the block of uncompressed data or of an accumulated compressed representation of all previously processed sub-block configurations, then the size variable will be smaller than the current value of the smallest size variable. In this case, accumulated compressed representation is buffered as a best compressed representation of the block and any previously buffered best compressed representation of the block is discarded, the best transform indicator is set to represent the current transform (i.e. the currently processed sub-block configuration) and the smallest size variable value is set to the current size variable value, otherwise the currently accumulated compressed representation of the block is discarded and the best transform indicator and the smallest size variable values are not changed.

After applying the k different sub-block configurations, if the best transform indicator is still set to the no-transform value, then it is determined that no sub-block configuration gave an effective compression of the block and the block is transferred in uncompressed format for storage or transmission as appropriate. Alternatively, if the best transform indicator is set to a value representing a particular transform (i.e., a particular sub-block configuration), then the accumulated compressed representation for that transform is transferred for storage or transmission as appropriate.

FIG. 8 sets out pseudo code for an example decompression process as performed by an example decompression unit 42. As with the operation of the compression unit, the decompression unit 42 can be operable serially as indicated by the pseudo code in FIG. 8, or could be done, at least in part, in parallel, for example in separate hardware units, or using separate process threads processed in parallel. For ease of explanation only, the pseudo code of FIG. 8 will be explained as being processed by a single thread.

A decompression unit 42 is operable to receive or to read a block of compressed (potentially compressed) data.

The compression unit is operable to determine for a particular block whether the data is compressed or not with reference to a compressed flag associated with the block of data as represented in FIG. 6. If the compressed flag indicated that the block of data is not compressed, the block of data is transferred for storage or transmission as appropriate. Alternatively, if the compressed flag indicated that the block of data is compressed, then the block of data is processed further as set out in FIG. 8.

Values of n and m are assigned according to a block format indicated by the sub-block configuration tag associated with the block of data as illustrated in FIG. 6.

Then, for each of b/(n*m) times, the decompression unit 42 is operable to process a sub-block of the data.

If a sub-block flag associated with a sub-block indicates that the sub-block is compressed based on a transformed sub-block, then each transformed row of the sub-block is processed. If a repeat flag is set for a transformed row of the sub-block, then the next byte is repeated m times for that transformed row. Alternatively, if the repeat flag is not set for a transformed row of the sub-block, then the next m bytes are used to define that transformed row. The n rows of the sub-block can then be transposed to generate the uncompressed sub-block of m rows of n bytes.

If a sub-block flag associated with a sub-block indicates that the sub-block is compressed based on a non-transformed sub-block, then a predetermined decompression algorithm (e.g., FPC) is used to generate the uncompressed sub-block of m rows of n bytes.

Each of the sub-blocks are processed to generate the original b bytes of uncompressed data.

Accordingly, there has been described an example of compression and decompression methods and apparatus.

In some embodiments, it is envisaged that data comprising a variable number of data words, having different numbers of data groups, and arranged in different data block sizes can be manipulated according to the transform and compression/decompression methodologies described herein. Indeed, as described above, these variables can themselves be applied as parameters in the compression and decompression methodology.

Thus, the number of bytes in a block of data to which the compression/decompression methodology are applied may be varied as a parameter. Where the transform and compression scheme are applied on a block-by-block basis, the block size could, for example, be set at 4 bytes, 32 bytes, 512 bytes, 8 kB or 1 MB. Typically, the block size can be chosen to correspond to a block size which is used in the memory of a computer system. In one particular example, the block size can correspond to the page size in a memory of a computer system, while in another particular example, the block size can correspond to a cache block size in the memory of the computer system.

For a given block size, there can be a given number of data words. For example, the data block can be split into 2, 4, 8, 64 or any other convenient number of data words.

Similarly, each data word can be split into any convenient number of groups, for example, 2 groups, 4 groups, 8 groups, 64 groups. Note that the number of data groups in each data word does not place any constraints on the number of data words in each data block. While, in the example described above, the data block includes the same number of data words as there are data groups in each data word, this need not necessarily be the case. As described above, the consequence of having, for example, more data groups in each data word than there are data words in each data block, is that when the data transform is applied to the uncompressed data, the resulting transformed data comprises more data words than there are data groups in each data word. Nevertheless, this need not inhibit or prevent the application of a data compression scheme such as FPC scheme to the transformed data words.

While the block size, word number and data group numbers can be tailored to correspond to the characteristics of a computer system, they could also be varied to maximize compression. For example, compression can be applied using different block sizes, word numbers and data group numbers to select a compression type which is best.

As indicated above a tag can be added to compressed data, thereby to indicate whether the data has been compressed, and/or to indicate characteristics of the compression/decompression methodology which have been applied. The tag can be in the form of a binary prefix comprising a number of bits n, which indicates whether the data is compressed and the parameters for the compression which has been used. In one example, a null tag value such as "0" can indicate that the data is uncompressed.

Embodiments of this invention find application to the compression of floating point numbers, which are held in memory according to the IEEE 754 standard. According this standard, a floating point number is represented as shown equation 1 below $$\text{f.p.n.} = s \times f \times 2^c \quad (1)$$

Thus, when storing the number in the memory of a computer system according to this standard, three fields are provided, namely a sign bit "s", an exponent "c" and a mantissa "f". The signed bit s is always one bit while the number of bits which are used to encode c and f can be varied according to the degree of precision which is desired.

Thus there has been described a method and apparatus for compressing uncompressed data by applying a transform prior to the application of a data compression scheme. At decompression time, a transform can be applied after a data decompression scheme has been applied to compressed data.

In one example embodiment, the method of compressing can include compressing uncompressed data from a first level memory of a computer system and storing the compressed data in a second level memory of the computer system.

It should be noted that references to a first level memory in this document does not mean a memory at a level one, rather that it relates to an nth level (n being an integer) of a plurality of memory levels. Similarly, references to a second level memory in this document does not mean a memory at a level two, or a memory at a level necessarily adjacent to adjacent the first level, rather that it relates to an n+mth level (n and m being integers) of a plurality of memory levels.

In one example, the first level memory could comprise a cache, the plurality of data words in the uncompressed data could correspond to a cache line of data in the cache, the second level memory could comprise a main memory and the method could comprise writing the transformed and compressed data to the main memory. In another example, the first level memory could comprise an L2 cache, the second level memory could comprise an L3 cache, the plurality of data words in the uncompressed data could correspond to a cache line of data in the L2 cache and the method could comprise writing the transformed and compressed data to the L3 cache.

An example embodiment of the method of compressing can include compressing uncompressed data and transferring the compressed data words from a first location to a second location.

An example of the method of compressing can include applying the transform and/or data compression scheme to uncompressed data comprising different sized data blocks, data words or data groups, wherein the transform and/or data compression scheme are applied to the different sized data words, data groups and/or data blocks in parallel.

An example of the method of compressing can include applying the transform and/or data compression scheme to uncompressed data comprising different sized blocks, data words or data groups, and selecting a best transform and/or compression scheme to use according to the degree of compression which is achieved.

An example of the method of decompressing can comprise applying the data decompression scheme and/or transform to produce different sized data blocks, data words or data groups, wherein the data decompression scheme and/or transform are applied to produce the different sized data blocks, data words or data groups in parallel.

As described above, the invention could be implemented in hardware in a computer system. Alternatively, the invention may be implemented in software, in the form of a computer program product. In some embodiments, the computer program product can be provided on a carrier medium.

Although an embodiment can be implemented in hardware or firmware, other embodiment can provide a computer program product on a carrier medium, the program product including program instructions executable in a computer system to implement a method of compressing uncompressed data from a first level memory of a computer system for storage in a second level memory of the computer system.

A computer program product can be in the form of a computer program, for example on a carrier medium. The carrier medium could be a storage medium, such as a solid state, magnetic, optical, magneto-optical or other storage medium. The carrier medium could be a transmission medium such as broadcast, telephonic, computer network, wired, wireless, electrical, electromagnetic, optical or indeed any other transmission medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of compressing data comprising blocks of data, the method comprising:
    dividing a block of data into b/(n*m) sub-blocks, where b is a number of bytes in the block and n and m are integers;
    for each sub-block, determining the smaller of a compressed representation of a transform of the sub-block and a compressed representation of the sub-block, wherein said determining comprises, for a sub-block:
    defining a matrix of m rows of n bytes from the block;
    transforming the matrix; and
    generating a compressed version of the transformed matrix; and
    where an accumulated size of the determined smaller compressed representations of the sub-blocks is smaller than a size of the block, selecting the determined smaller compressed representations of the sub-blocks as a compressed representation of the block.

2. The method of claim 1, comprising setting a compressed flag to a first value where the determined smaller compressed representations of the sub-blocks are selected as a compressed representation of the block.

3. The method of claim 1 comprising storing the determined smaller compressed representations of the sub-blocks as a compressed representation of the block and a compressed flag having the first value where an accumulated size of the determined smaller compressed representations of the sub-blocks is smaller than a size of the block, and otherwise storing the block of data and the compressed flag having a second value.

4. The method of claim 1, comprising, for each sub-block, setting a sub-block flag for the sub-block to a first value when the compressed representation of a transform of the sub-block is smaller than the compressed representation of the sub-block and setting the sub-block flag for the sub-block to a second value when the compressed representation of the sub-block is smaller than the compressed representation of a transform of the sub-block.

5. The method of claim 1, wherein said generating comprises, for each of n transformed rows of the transformed matrix:
    if the transformed row of m bytes comprises m repeated bytes, recording the first byte and setting a transform flag for the transformed row to a first value;
    otherwise recording the m bytes and setting the transform flag for the transformed row to a second value.

6. The method of claim 1:
    wherein, for each of a plurality of passes, each pass employing a respective sub-block configuration of n*m bytes:
    dividing the block into sub-blocks of the respective n*m sub-block configuration; and
    for each sub-block, selecting the smaller of a compressed representation of a transform of the sub-block or a compressed representation of the sub-block; and
    wherein the compressed representations for the block are selected from the pass for which the accumulation of the selected compressed representations of the sub-blocks is smallest.

7. The method of claim 1, further comprising storing, for a block of data following compression, one or more fields including:
    a compressed flag field indicating whether the block is compressed or not;
    a sub-block configuration field identifying a sub-block configuration,
    a sub-block flag field including a sub-block flag for each sub-block identifying whether a compressed representation of a transform of a sub-block of uncompressed data or compressed representation of the sub-block of uncompressed data is used;
    a repeat field comprising repeat flags indicating whether stored data comprises repeated data;
    a prefixes field indicating prefixes for sub-blocks that are not transformed;
    a first data field for data for sub-blocks that are not transformed; and
    a second data field for data for sub-blocks that are transformed.

8. The method of claim 1, wherein blocks of uncompressed data are held in a first level memory of a computer system and blocks of compressed data are held in a second level memory of the computer system.

9. A method of decompressing blocks of data, the method comprising:
    for each of a plurality of sub-blocks of a block of compressed data, determining whether the sub-block comprises compressed data derived from uncompressed data that was transformed or uncompressed data that was not transformed;
    for each of n transformed rows of a sub-block derived from uncompressed data that was transformed:

creating a transformed row by repeating a next byte of the sub-block m times where a repeated flag associated with the transformed is indicative that the transformed row comprises repeated bytes; and creating a transferred row from the next m bytes where a repeated flag associated with the transformed row is indicative that the transformed row does not comprise repeated bytes; and decompressing and transforming the data where the sub-block comprises compressed data derived from uncompressed data that was transformed or decompressing without transforming the data where the sub-block comprises compressed data derived from uncompressed data that was not transformed.

10. The method of claim 9, comprising, for each sub-block, determining whether the sub-block comprises compressed data derived from uncompressed data that was transformed or uncompressed data that was not transformed by reference to a sub-block flag field associated with the sub-block.

11. The method of claim 9, comprising determining a sub-block configuration from a sub-block configuration field associated with the block of compressed data.

12. The method of claim 9, comprising, for a sub-block derived from uncompressed data that was compressed and was not transformed:
applying a predetermined decompression algorithm to decompress the compressed data to derive the decompressed data.

13. The method of claim 9, comprising:
for each block of data, determining from a compressed flag associated with the block determining whether the block is compressed or not, and if the block is not compressed, transferring the block of data.

14. The method of claim 9, wherein blocks of uncompressed data are held in a first level memory of a computer system and blocks of compressed data are held in a second level memory of the computer system.

15. An apparatus, comprising:
a processor;
a data compression unit coupled to the processor, the data compression unit being operable to:
divide a block of data into b/(n*m) sub-blocks, where b is a number of bytes in the block and n and m are integers;
for each sub-block, determine the smaller of a compressed representation of a transform of the sub-block and a compressed representation of the sub-block, wherein said determining comprises, for a sub-block:
defining a matrix of m rows of n bytes from the block;
transforming the matrix; and
generating a compressed version of the transformed matrix; and
where an accumulated size of the determined smaller compressed representations of the sub-blocks is smaller than a size of the block, select the determined smaller compressed representations of the sub-blocks as a compressed representation of the block.

16. An apparatus, comprising:
a processor;
a data decompression unit coupled to the processor, the data compression unit being operable to:
for each of a plurality of sub-blocks of a block of compressed data, determine whether the sub-block comprises compressed data derived from uncompressed data that was transformed or uncompressed data that was not transformed;
for each of n transformed rows of a sub-block derived from uncompressed data that was transformed:
create a transformed row by repeating a next byte of the sub-block m times where a repeated flag associated with the transformed is indicative that the transformed row comprises repeated bytes; and
create a transferred row from the next m bytes where a repeated flag associated with the transformed row is indicative that the transformed row does not comprise repeated bytes; and
decompress and transform the compressed data where the sub-block comprises compressed data derived from uncompressed data that was transformed or to decompress without transforming the data where the sub-block comprises compressed data derived from uncompressed data that was not transformed.

17. A non-transitory computer readable medium comprising program code operable to cause at least one processor:
to divide a block of data into b/(n*m) sub-blocks, where b is a number of bytes in the block and n and m are integers;
for each sub-block, to determine the smaller of a compressed representation of a transform of the sub-block and a compressed representation of the sub-block, wherein said determining comprises, for a sub-block:
defining a matrix of m rows of n bytes from the block;
transforming the matrix; and
generating a compressed version of the transformed matrix; and
where an accumulated size of the determined smaller compressed representations of the sub-blocks is smaller than a size of the block, to select the determined smaller compressed representations of the sub-blocks as a compressed representation of the block.

18. A non-transitory computer readable medium comprising program code operable to cause at least one processor:
for each of a plurality of sub-blocks of a block of compressed data, to determine whether the sub-block comprises compressed data derived from uncompressed data that was transformed or uncompressed data that was not transformed;
for each of n transformed rows of a sub-block derived from uncompressed data that was transformed:
creating a transformed row by repeating a next byte of the sub-block m times where a repeated flag associated with the transformed is indicative that the transformed row comprises repeated bytes; and
creating a transferred row from the next m bytes where a repeated flag associated with the transformed row is indicative that the transformed row does not comprise repeated bytes; and
to decompress and transform the compressed data where the sub-block comprises compressed data derived from uncompressed data that was transformed or to decompress without transforming the data where the sub-block comprises compressed data derived from uncompressed data that was not transformed.

* * * * *